United States Patent
Appleyard et al.

(10) Patent No.: US 8,102,369 B2
(45) Date of Patent: *Jan. 24, 2012

(54) METHOD AND APPARATUS FOR DYNAMICALLY MODIFYING WEB PAGE DISPLAY FOR MOBILE DEVICES

(75) Inventors: James P. Appleyard, North Richland Hills, TX (US); Jason A. Gonzalez, Dallas, TX (US); Mathews Thomas, Flower Mound, TX (US); Keeley L. Weisbard, Frisco, TX (US)

(73) Assignee: International Business Machines Corporation, Armonk, NY (US)

( * ) Notice: Subject to any disclaimer, the term of this patent is extended or adjusted under 35 U.S.C. 154(b) by 839 days.

This patent is subject to a terminal disclaimer.

(21) Appl. No.: 12/126,626

(22) Filed: May 23, 2008

(65) Prior Publication Data

US 2008/0218475 A1  Sep. 11, 2008

Related U.S. Application Data

(63) Continuation of application No. 10/856,166, filed on May 28, 2004, now Pat. No. 7,400,316.

(51) Int. Cl.
*G06F 3/033* (2006.01)

(52) U.S. Cl. .................. 345/158; 345/156; 345/157

(58) Field of Classification Search .......... 345/156–173; 178/18.01; 715/788, 798, 802

See application file for complete search history.

(56) References Cited

U.S. PATENT DOCUMENTS

| | | | |
|---|---|---|---|
| 5,602,566 A | 2/1997 | Motosyuku et al. | |
| 6,288,704 B1 | 9/2001 | Flack et al. | |
| 6,347,290 B1 * | 2/2002 | Bartlett | 702/150 |
| 6,567,101 B1 * | 5/2003 | Thomas | 345/649 |
| 6,798,429 B2 | 9/2004 | Bradski | |
| 6,834,249 B2 * | 12/2004 | Orchard | 702/141 |
| 7,142,191 B2 | 11/2006 | Idesawa et al. | |
| 7,184,020 B2 * | 2/2007 | Matsui | 345/156 |
| 7,203,911 B2 | 4/2007 | Williams | |
| 7,271,795 B2 | 9/2007 | Bradski | |
| 7,400,316 B2 * | 7/2008 | Appleyard et al. | 345/156 |
| 7,679,604 B2 * | 3/2010 | Uhlik et al. | 345/158 |
| 7,827,698 B2 * | 11/2010 | Jaiswal et al. | 33/366.11 |
| 7,848,542 B2 * | 12/2010 | Hildreth | 382/107 |
| 2002/0140666 A1 | 10/2002 | Bradski | |
| 2002/0143489 A1 | 10/2002 | Orchard | |

FOREIGN PATENT DOCUMENTS

EP   1207072   5/2002

OTHER PUBLICATIONS

"Utilization of Motion Detection Information for System Resource Management in a Multi-Media Environment", IBM Tech. Discl. Bul., No. 10b, pp. 119-121, Mar. 1992.

* cited by examiner

*Primary Examiner* — Alexander S Beck
*Assistant Examiner* — Mansour M Said
(74) *Attorney, Agent, or Firm* — Novak Druce + Quigg LLP

(57) ABSTRACT

A method of dynamically modifying web page displays used in various mobile devices. The method uses a motion detection mechanism to detect whether the mobile device is moving or in motion and then modifies web page displays sent to the device based upon the sensor readings. As such, the method, system, and apparatus are capable of automatically modifying a display provided to a mobile device based upon a determination that the user and/or device are moving and/or in motion. In another aspect, the method, system, and apparatus are also capable of modifying the complexity of a display provided to a mobile device based upon the degree of movement and/or motion by the user and/or device.

16 Claims, 1 Drawing Sheet

METHOD AND APPARATUS FOR DYNAMICALLY MODIFYING WEB PAGE DISPLAY FOR MOBILE DEVICES

CROSS REFERENCE TO RELATED APPLICATIONS

This application is a continuation of, and accordingly claims the benefit from, U.S. patent application Ser. No. 10/856,166, now issued U.S. Pat. No. 7,400,316, which was filed in the U.S. Patent and Trademark Office on May 28, 2004.

BACKGROUND

1. Field of the Invention

The present invention relates to the field of the transfer of electronic information and, more particularly, to displays of web pages on mobile devices.

2. Description of the Related Art

With the growth of wireless mobile devices, there is a concurrent growth with providing adaptability and improved ease of use and interactivity. The mobile wireless device may be any device capable of receiving a visual communication from a wireless or non-wireless device or network, a server or other communication network, including, but not limited to, a cellular phone, a laptop computer, personal digital assistant (PDA), a pager, a smart phone, or any other suitable device as recognized by one having ordinary skill in the art to receive visual communication.

Highly miniaturized computing devices, such as handheld computers and PDAs, have significant operational limitations as a consequence of their small size. In particular, the visual display is highly constrained: the small size greatly restricts the size of images and/or data displayed to the screen.

Accordingly, due to the size of screens, one of the major problems facing users of mobile devices is the ability to read what is displayed on the screen of the device while the user is in motion. A user that is in motion may not be able to read the display on the mobile device, while a user that is stationary would be able to read the display. The bulk of mobile screens that have been developed are suitable for stationary users, but difficult for users on the move to read. For example, it is easy to check one's flight schedule if one is sitting at an airport terminal. However, a traveler who is rushing from one gate to another is unlikely to use his personal digital assistant (PDA) to confirm the departure gate as he would likely have to stop to read the display, which would cost the traveler time he may not have.

There have been a few proposed solutions to this problem. One technique is the development and use of very simple screens that may be easily read by the user on the move, as well as by the stationary user. The disadvantage of this technique is that the stationary user may find these simple screens to be simple and dull and may not use it, in part, due to the limited amount of information provided.

Another proposed option is to provide a profile that a user may specify if they wish to see a simple screen, a medium screen or a complex screen. The appropriate screen would then be displayed. The disadvantage of this technique is that the user has to manually modify the profile when their situation changes, and many users will not or can not do this, especially a user suddenly on the move attempting to change their preference from a complex screen to a simpler one.

Accordingly, it would be beneficial to provide a system and method that is capable of automatically modifying a display provided to a mobile device based upon a determination that the user and/or device are moving and/or in motion. It would also be beneficial to provide a system and method that is capable of automatically modifying the complexity of a display provided to a mobile device based upon the degree of movement and/or motion by the user and/or device.

SUMMARY OF THE INVENTION

The present invention provides a method, system, and apparatus for modifying a web page display for a mobile device. More specifically, the present invention is capable of automatically modifying a display provided to a mobile device based upon a determination that the user and/or device are moving and/or in motion. In another aspect, the present invention provides a method, system, and apparatus for modifying the complexity of a display provided to a mobile device based upon the degree of movement and/or motion by the user and/or device.

In one embodiment, the present invention provides a method for modifying a web page display for a mobile device including the steps of determining a movement status of the mobile device using a motion detection mechanism; setting a motion parameter based upon the movement status; sending a request for electronic content from the device, wherein the request includes the motion parameter; receiving the electronic content; and displaying the received electronic content; wherein a complexity of the electronic content varies based upon the motion parameter.

In another embodiment, the present invention provides a machine-readable storage having stored thereon, a computer program having a plurality of code sections, said code sections executable by a machine for causing the machine to perform the steps of determining a movement status of the mobile device using a motion detection mechanism; setting a motion parameter based upon the movement status; sending a request for electronic content from the device, wherein the request includes the motion parameter; receiving the electronic content; and displaying the received electronic content; wherein a complexity of the electronic content varies based upon the motion parameter.

In yet another embodiment, the present invention provides a system for modifying a web page display for a mobile device including a motion detection mechanism for determining a movement status of the mobile device; means for setting a motion parameter based upon the movement status; means for sending a request for electronic content from the device, wherein the request includes the motion parameter; means for receiving the electronic content; and a display for displaying the received electronic content; wherein a complexity of the electronic content varies based upon the motion parameter.

In still another embodiment, the present invention provides a method for modifying a web page display for a mobile device including the steps of receiving a request for electronic content from the mobile device, wherein the request includes a motion parameter; and sending the requested electronic content; wherein a complexity of the electronic content that is sent varies based upon the motion parameter.

In yet another embodiment, the present invention provides a machine-readable storage having stored thereon, a computer program having a plurality of code sections, said code sections executable by a machine for causing the machine to perform the steps of receiving a request for electronic content from a mobile device, wherein the request includes a motion parameter; and sending the requested electronic content; wherein a complexity of the electronic content that is sent varies based upon the motion parameter.

In still another embodiment, the present invention provides a system for modifying a web page display for a mobile device including means for receiving a request for electronic content from the mobile device, wherein the request includes a motion parameter; and means for sending the requested electronic content; wherein a complexity of the electronic content that is sent varies based upon the motion parameter.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
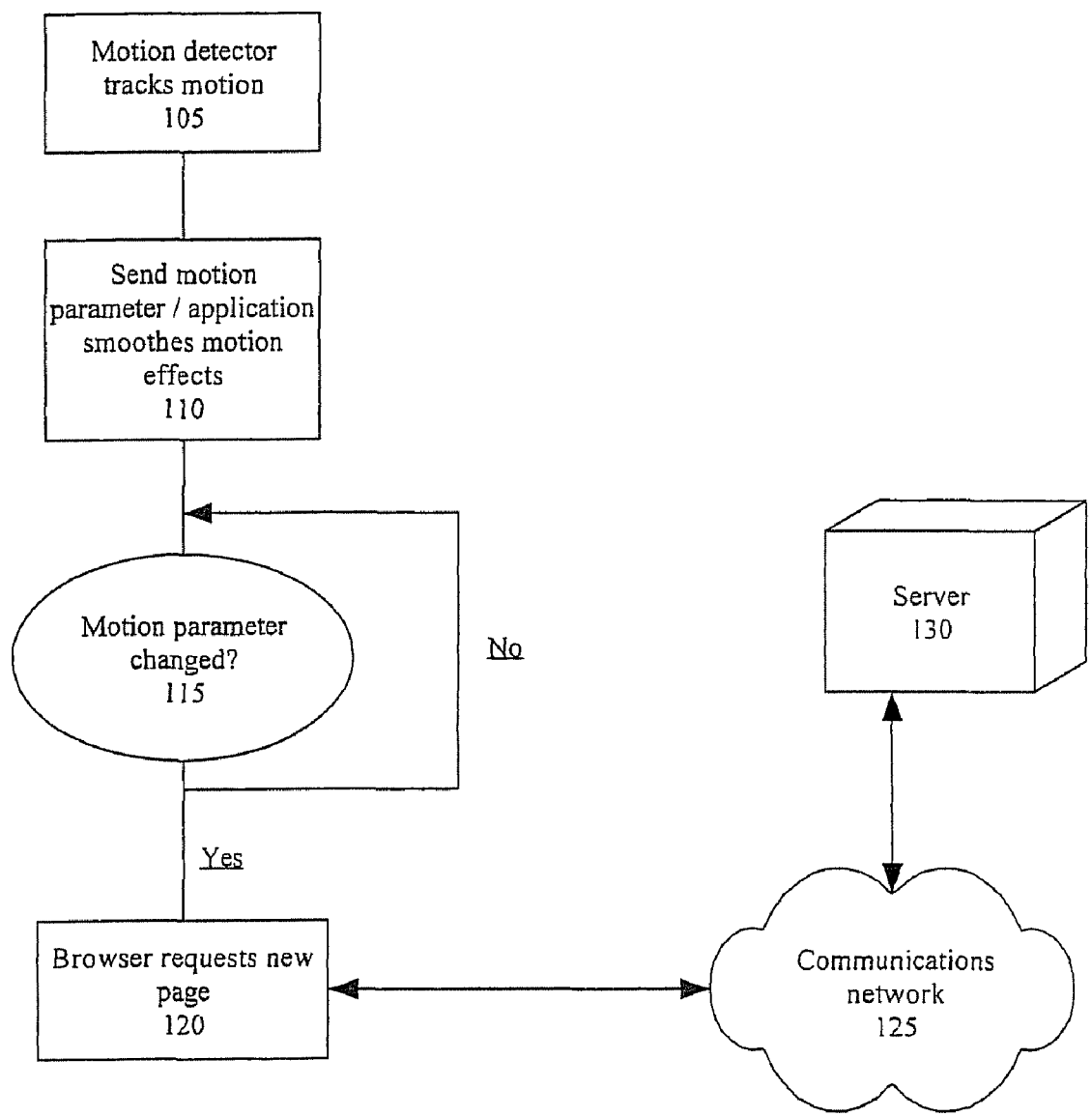
FIG. 1 is a schematic diagram illustrating one embodiment of a system for modifying a web page display for a mobile device.

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of."

The present invention provides a method, system, and apparatus for modifying a web page display for a mobile device. More specifically, the present invention provides a method, system, and apparatus that are capable of automatically modifying a display provided to a mobile device based upon a determination that the user and/or device are moving and/or in motion. In another aspect, the present invention is also capable of modifying the complexity of a display provided to a mobile device based upon the degree of movement and/or motion by the user and/or device.

One of the advantages of the present invention is that information that is provided to a user may be customized based on the movement status of the user—more specifically, how prepared a user is to view a web page based on an activity he or she is performing. This makes it much more likely that the user will view the information that is presented and/or respond accordingly. Known solutions that depend on profiles are not capable of dynamically changing content based on the state of the user unless the user manually updates their profile with any stated information. Content providers may also benefit from the present invention as they are better able to effectively target their users as they will not waste time and bandwidth transmitting complex information to a user who has little time to view the page while users that have a lot of time on their hands may have more meaningful information sent to them. The content providers may also make better decisions on whether to increase any audio and/or visual content of any information as someone in motion is more likely to pay attention to an audio clip than someone who is sitting still.

The present invention utilizes a motion detection mechanism that is embedded within or attached to a mobile device. The motion detection mechanism detects the degree of movement that the user has. This information may then be fed to the browser on the mobile device, either real time or with a slight delay to ensure the user has actually had a change in their movement status. The browser may then send a motion parameter to the application server when requesting a page that indicates the degree of movement the user is experiencing, and the application server would then respond with an appropriate page. As such, when a user shows a high degree of movement, the resulting display would be a simple page and a user with a lower degree of movement would be shown a more complex display.

In one aspect, from the perspective of the device, after a motion parameter has been set, the device requests electronic content and includes this motion parameter in the request. The inclusion of the motion parameter in the request enables the application server, once the motion parameter is received, to send electronic content to the device, wherein the complexity of the electronic content that is sent and, therefore, that will be displayed on the device, varies based upon this motion parameter. If the motion parameter indicates a high degree of movement, such as someone running, the complexity of the electronic content to be displayed would be simpler. If the motion parameter indicates a low degree of movement, such as someone standing or walking slowly, the complexity of the electronic content to be displayed would be greater.

Accordingly, in one embodiment, the present invention provides a system that detects the movement status of the user and/or device. As used herein, the "movement status" is used to refer to the determination of whether the user and/or device are in motion and/or moving. Then, depending on this determination, a motion parameter is provided to the application server. If the determination is that the user is in motion, a simpler web display may be provided by the server to the display of the device. If the determination is that the user is not in motion, a more complex web display may be provided by the server to the display of the device.

In another embodiment, the system continues to detect whether the user and/or device is in motion on a periodic basis and, once the system detects a change in the movement status of the user and/or device, the complexity of the web page may then be changed to reflect the new movement status.

In another embodiment, the system of the present invention includes two possible displays—a simple display and a complex display. However, it may be beneficial in certain situations to have more than two potential displays, such as, for example, a simple display, a medium complexity display, and a complex display. This embodiment may be beneficial when the system determines that the degree of movement is less than in other situations. For example, if a user is walking through a terminal or down the street, the degree of movement is less than if the same user were running. As such, based upon this difference in movement, a medium complexity screen may be provided to the user that is walking while a simple screen may be provided to the user that is running. It is to be understood that additional degrees of complexity may be incorporated based upon other factors including, but not limited to, whether the person is moving independently or is in a vehicle, and/or the speed at which a person is moving.

In addition to increased numbers of displays, in alternative embodiments, the response may be even more sophisticated such that the user having a higher degree of movement may be shown a simple page together with audio and/or video enabled portlets, or simply an audio clip with a voice-enabled portlet (e.g. audio that states "Please state your flight number" and the user responds by voice) if the motion detection mechanism detects a significant amount of movement from the user. Accordingly, while the electronic content that is sent may have a higher degree of programming complexity due to the portlets, the actual display on the device is simpler and/or easier to operate by the user while the user is moving.

The system and method of the present invention detects whether the user and/or device is in motion and/or moving.

This may be accomplished using any movement detection mechanism that may be incorporated into the device and that is capable of detecting, either alone or in combination with other systems, whether the user and/or device is in motion and/or moving. For example, in one embodiment, the mechanism is a motion detector that is incorporated into the device. Examples of motion detectors useful in the present invention include, but are not limited to, gyroscopes and accelerometers. In another embodiment, the mechanism is a global position system (GPS) receiver that is embedded in or attached to the device. Then, in conjunction with GPS satellites and/or other GPS systems, the GPS receiver may be used to show that the user and/or device are moving. In yet another embodiment, the mechanism may be the signal sent from the device, such as a cellular signal, that may be tracked using triangulation techniques to show the location and/or subsequent movement of the user and/or mobile device.

The motion detection mechanism may also be used not only to detect whether the user and/or device is in motion, but also the degree of movement that the device is experiencing. This degree of movement may be affected by not only the speed at which the device is moving, but also the direction. As such, a device that is moving at a given rate of speed while being rotated would have a different degree of movement than one that is moving at the same speed, but in a straight line. In general, a "degree of movement" is used to define the speed and/or direction of movement, such that as the speed of movement increases, so does the degree of movement, and such that as the direction of movement increases, so does the degree of movement.

In select embodiments, the motion detection mechanism may be turned on and off at the discretion of the user. As such, the motion detection mechanism may be turned off in those instances where a user may not want it on, such as when the device is on a bumpy road. It is contemplated that the motion detection mechanism will be on a majority of the time, however.

In other embodiments, the present invention may include a feedback application that accepts the input parameter from the motion detection mechanism and does additional processing on the data to smooth out the effects of the movement. For example, if the user suddenly jerks his hand, the feedback application is able to detect this and will not redirect the user to a different web page, but rather will use a smoothing parameter, such as a DSP algorithm or other image processing technique capable of smoothing or stabilizing an image to account for motion, to smooth the display on the device, rather than requesting a less complex display. For example, the feedback application can process the content to be displayed in cases where the motion detected does not last longer than a predetermined time period.

The present invention also uses a web browser that accepts inputs from any feedback application and/or the device and sends the input as a parameter to an application server. The application server reads the parameter from any feedback application and/or browser and serves the appropriate web page to the browser. Most application servers can currently serve pages based on the device type so it is contemplated that, with minor modifications, existing application servers may be capable of processing any smoothing and/or motion parameter.

FIG. 1 is a schematic diagram illustrating one embodiment of a system and method 100 of modifying a web page display for a mobile device according to one embodiment of the present invention. In the system 100, a motion detection mechanism tracks motion in a wireless or other type of mobile device in step 105. A motion parameter is then sent at a specified time interval with the application smoothing any motion effects in step 110 and setting a motion parameter. In step 115, the motion parameter is examined. If the parameter has changed then, in step 120, the browser requests a new page. If the motion parameter has not changed, then the system returns and waits for the next motion parameter.

When the browser requests the new page 120, the motion parameter is sent, through the communications network 125, to server 130, i.e. an application server or the like. The server can identify and select the new page based upon the motion parameter and send this new page to the browser. The updated page is sent through the communications network 125 and back to the browser of the device, where it is displayed and/or rendered.

Notably, the server 130 can dynamically create a page or content to be sent to the browser according to the received motion parameter. Alternatively, the server 130 can include a variety of pages tailored for different motion parameters, i.e. of varying visual complexity and/or including audio content. In this case, the server 130 can select content from the existing content according to the motion parameter. In any case, the communications network 125 can include, but is not limited to, the Internet, the World Wide Web, intranets, local and/or wide area networks, the public switched telephone network, as well as wireless mobile and/or cellular networks.

The following example is presented as one possible use of the present invention. A sales associate that has a few minutes to spare is sitting at his desk with a mobile device looking at some product information. He is fairly stationary, so a complex page showing detailed product information is displayed. A customer approaches him and asks the location of a given product. The associate has a general idea of where the product is located and starts to walk towards the item. In the interim, the mobile device detects his movement using the motion detection mechanism and sends a parameter to the server to display a different page that is voice enabled. While walking to the item, the associate is able to search for the item and location using his voice to interact with the voice enabled content so that he is still able to take the customer to the correct location. When he gets there, the associate notices that there isn't anything available on the shelf. As he is stationary for a few moments, a different page is displayed to him—one of medium to low complexity where he may then make an inquiry about the inventory of the product and refill the stock if necessary.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a)

conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A non-transitory machine-readable storage having stored thereon, a computer program having a plurality of code sections, said code sections executed by a machine for causing the machine to perform the steps of:
   determining a movement status of a user of a mobile device using a motion detection mechanism;
   setting a motion parameter based upon the movement status;
   sending a request for electronic content to a server from the mobile device, wherein the request includes the motion parameter;
   receiving the electronic content from the server; and
   displaying the received electronic content;
   wherein a complexity of the electronic content varies based upon the motion parameter.

2. The non-transitory machine-readable storage of claim 1, further comprising the step of smoothing the display using a feedback application.

3. The non-transitory, machine-readable storage of claim 1, wherein the motion detection mechanism is selected from a gyroscope, an accelerometer, a global positioning system receiver, and a cellular signal.

4. The non-transitory machine-readable storage of claim 1, wherein the complexity of the electronic content is varied such that a more complex display is provided when the device has a lower degree of movement and a less complex display is provided when the device has a higher degree of movement.

5. The non-transitory machine-readable storage of claim 4, wherein the display includes an additional response selected from an audio enabled portlet, a video enabled portlet, an audio clip with a voice-enabled portlet, and a combination thereof.

6. A system for modifying a web page display for a mobile device based on a movement status of a user of the mobile device, the system comprising:
   a motion detection mechanism for determining the movement status of the user;
   means for setting a motion parameter based upon the movement status;
   means for sending a request for electronic content to a web server from the mobile device, wherein the request includes the motion parameter;
   means for receiving the electronic content from the web server; and
   a display for displaying the received electronic content;
   wherein a complexity of the electronic content varies based upon the motion parameter.

7. The system of claim 6, further comprising a feedback application for smoothing the display.

8. The system of claim 6, wherein the motion detection mechanism is selected from a gyroscope, an accelerometer, a global positioning system receiver, and a cellular signal.

9. The system of claim 6, further comprising means for adjusting the display such that a more complex display is provided when the device has a lower degree of movement and a less complex display is provided when the device has a higher degree of movement.

10. The system of claim 9, wherein the display includes an additional response selected from an audio enabled portlet, a video enabled portlet, an audio clip with a voice-enabled portlet, and a combination thereof.

11. A non-transitory machine-readable storage having stored thereon, a computer program having a plurality of code sections, said code sections executed by a machine for causing the machine to perform the steps of:
    receiving a request for electronic content from a mobile device, wherein the request includes a motion parameter set based upon a movement status of a user of the mobile device determined using a motion detection mechanism; and
    sending the requested electronic content to the mobile device;
    wherein a complexity of the electronic content that is sent varies based upon the motion parameter.

12. The non-transitory machine-readable storage of claim 11, wherein the complexity of the electronic content that is sent is varied such that a more complex electronic content is provided when the device has a lower degree of movement and a less complex electronic content is provided when the device has a higher degree of movement.

13. The non-transitory machine-readable storage of claim 12, wherein the electronic content that is sent includes an additional response selected from an audio enabled portlet, a video enabled portlet, an audio clip with a voice-enabled portlet, and a combination thereof.

14. A system for modifying a web page display for a mobile device based on a movement status of a user of the mobile device, the system comprising:
    means for receiving a request for electronic content from the mobile device, wherein the request includes a motion parameter set based upon the movement status of the user as a whole of the mobile device determined using a motion detection mechanism; and
    means for sending the requested electronic content to the mobile device;
    wherein a complexity of the electronic content that is sent varies based upon the motion parameter.

15. The system of claim 14, further comprising means for adjusting the complexity of the electronic content that is sent such that a more complex electronic content is sent when the device has a lower degree of movement and a less complex electronic content is sent when the device has a higher degree of movement.

16. The system of claim 15, wherein the electronic content that is sent includes an additional response selected from an audio enabled portlet, a video enabled portlet, an audio clip with a voice-enabled portlet, and a combination thereof.

* * * * *